United States Patent [19]

Olson et al.

[11] Patent Number: 5,479,628
[45] Date of Patent: Dec. 26, 1995

[54] VIRTUAL ADDRESS TRANSLATION HARDWARE ASSIST CIRCUIT AND METHOD

[75] Inventors: Stephen W. Olson, Wilmington; James B. MacDonald, Dracut, both of Mass.; Richard W. Lones, Amherst, N.H.

[73] Assignee: Wang Laboratories, Inc., Lowell, Mass.

[21] Appl. No.: 135,037

[22] Filed: Oct. 12, 1993

[51] Int. Cl.⁶ ............................ G06F 12/10; G06F 12/14
[52] U.S. Cl. .................... 395/416; 395/421.05; 395/490; 364/DIG. 1
[58] Field of Search ..................................... 395/400, 425

[56] References Cited

U.S. PATENT DOCUMENTS

| | | | |
|---|---|---|---|
| 4,096,568 | 6/1978 | Bennett et al. | 395/400 |
| 4,128,875 | 12/1978 | Thurber et al. | 395/400 |
| 4,410,941 | 10/1983 | Barrow et al. | 395/400 |
| 4,638,426 | 1/1987 | Change et al. | 395/400 |
| 4,654,777 | 3/1987 | Nakamura | 395/400 |
| 4,680,700 | 7/1987 | Hester et al. | 395/400 |
| 4,714,993 | 12/1987 | Livingston et al. | 395/400 |
| 5,023,777 | 6/1991 | Sawamoto | 395/400 |
| 5,265,227 | 11/1993 | Kohn et al. | 395/400 |
| 5,287,475 | 2/1994 | Sawamoto | 395/400 X |

FOREIGN PATENT DOCUMENTS

| | | | |
|---|---|---|---|
| 0272670 | 6/1988 | European Pat. Off. | G06F 12/10 |

OTHER PUBLICATIONS

Holden et al., 1987 IEEE International Conference on Computer Design: VLSI In Computers & Processors, 'Integrated Memory Management for MC68030' Oct. 5, 1987, N.Y., pp. 586–589.

*Primary Examiner*—Michael A. Whitfield
*Attorney, Agent, or Firm*—Kenneth L. Milik

[57] ABSTRACT

A method, and circuitry that operates in accordance with the method, for generating an entry for a translation buffer in a data processor that employs virtual memory addressing. The method includes the first steps of storing a Faulted Virtual Address in a first register (96) and a Zone Table Address (ZTA) in a second register (94). In response to the execution of a micro-instruction, a next step forms an address in memory of a Zone Table Entry (ZTE) by selectively combining a first portion of the content of the first register with the content of the second register, while simultaneously testing the ZTA for physical address mapping. In response to an execution of a next micro-instruction, a next step accesses the ZTE with the formed address, and forms an address in memory of a Segment Table Entry (STE) by selectively combining a second portion the content of the first register with a content of the ZTE, while simultaneously testing the ZTE for a Zone fault. In response to an execution of a next micro-instruction, a next step accesses the STE with the formed address, and forms an address in memory of a Page Table Entry (PTE) by selectively combining a third portion of the content of the first register with a content of the STE, while simultaneously testing the STE for a Zone fault. In response to an execution of a next micro-instruction, a next step accesses the PTE with the formed address and selectively combines the content of the STE with the content of the PTE and outputs the combination as the translation buffer entry, while simultaneously testing the PTE for a Page fault.

15 Claims, 8 Drawing Sheets

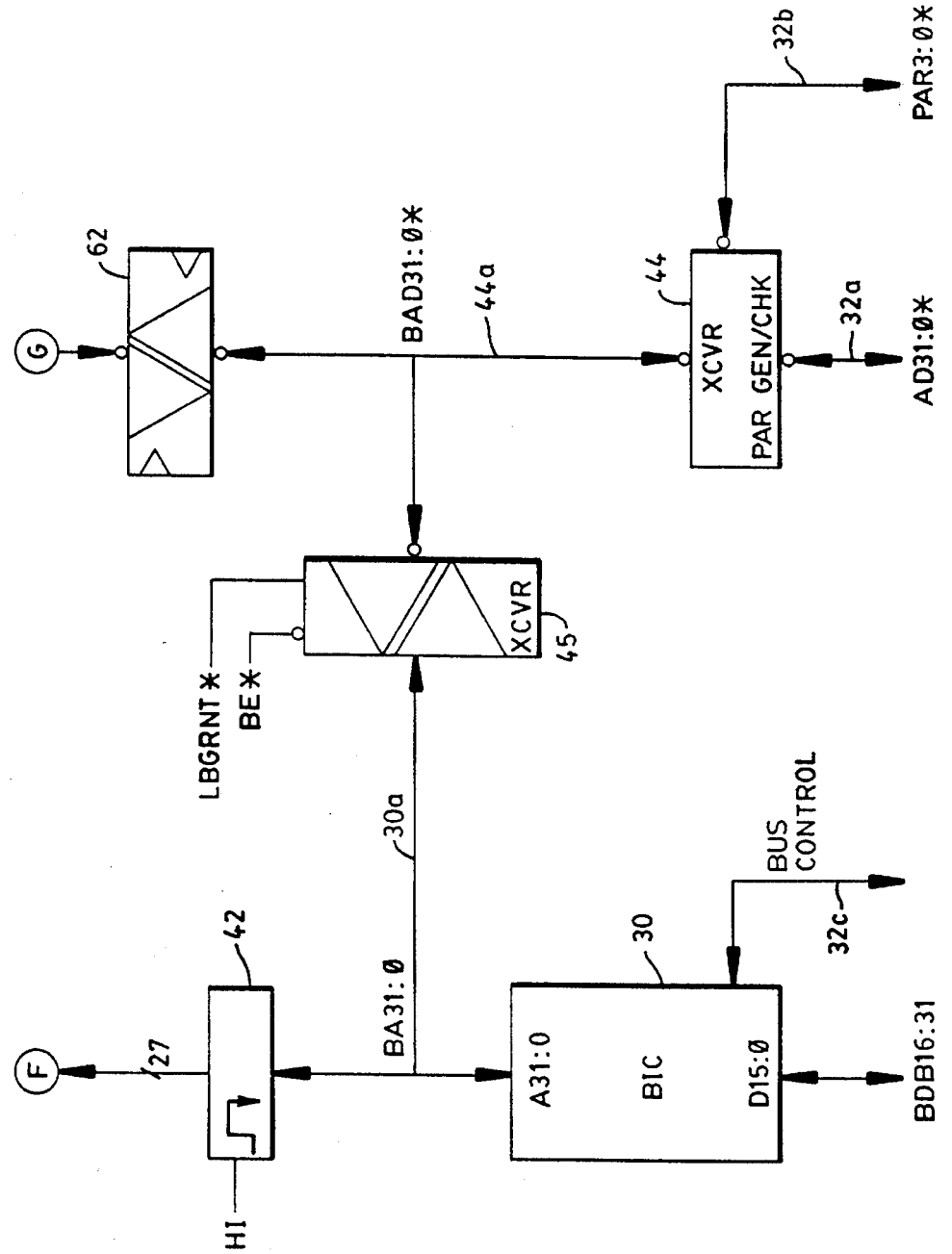

VIRTUAL ADDRESS TRANSLATION HARDWARE ASSIST CIRCUIT AND METHOD

FIELD OF THE INVENTION

This invention relates generally to digital data processors and, in particular, to circuits and methods for use in translating a virtual address to a physical memory address.

BACKGROUND OF THE INVENTION

Data processing systems that employ virtual addressing techniques are well represented in the prior art. By example, the following U.S. Patents all disclose subject matter that is related to the translation of virtual addresses into real or physical memory addresses.

In U.S. Pat. No. 4,128,875, Dec. 5, 1978, "*Optional Virtual Memory System*", K. Thurber et al. describe a memory addressing mechanism that works with three address structures: real, based, and virtual. Table II of this patent describes virtual address translation steps of the prior art (referenced to FIG. 8). For a four segment computer address containing process, segment, page and offset identifiers, the translation steps are said be as follows.

1. Reference memory into process table using process number for offset and a predetermined reference.
2. Obtain segment pointer from process table reference.
3. Reference memory into segment table using segment pointer as reference and segment number as offset.
4. Obtain page pointer from segment table reference.
5. Reference memory into page table using page pointer as reference and page number as offset.
6. Obtain frame number from page table reference.
7. Concatenate frame number with deflection to obtain real memory address.
8. Reference memory using real memory address.

A total of four memory references are thus required (steps 1, 3, 5, and 8).

In U.S. Pat. No. 4,638,426, Jan. 20, 1987, "*Virtual Memory Address Translation Mechanism with Controlled Data Persistence*", A. Chang et al. describe a two step address translation function and the use of a Translation Look-Aside Buffer (TLB).

In U.S. Pat. No. 4,680,700, Jul. 14, 1987, "*Virtual Memory Address Translation Mechanism with Combined Hash Address Table and Inverted Page Table*", P. Hester et al. describe a translation mechanism that includes a combined table in memory which stores as a first list the respective virtual address of each memory address referred to as an Inverted Page Table, and a second list that connects each of a plurality of hashed addresses with a predetermined initial virtual address of a linked group of virtual addresses.

In U.S. Pat. No. 4,714,993, Dec. 22, 1987, "*Apparatus and Method for Effecting Dynamic Address Translation in a Microprocessor Implemented Data Processing System*", D. Livingston et al. describe the use of a RAM-based storage unit that functions as a page address table. Circuitry, including macrocode, is employed to initialize and update the contents of the storage unit as required. The storage unit is coupled to an address bus of a microprocessor from whence it receives the page portion of a virtual address to be translated.

In U.S. Pat. No. 4,096,568, Jun. 20, 1978, "*Virtual Address Translator*", D. Bennett et al. describe the use of a content addressable memory (CAM) and a word addressed memory in a virtual address translator. A task name and subsegment number are used as a key to search the content addressable memory. A subsegment descriptor read out of the content addressable memory includes an absolute base address which is added to a deflection field to obtain an absolute memory address.

Finally, in commonly assigned U.S. Pat. No. 4,410,941, Oct. 18, 1983, "*Computer Having an Indexed Local RAM to Store Previously Translated Virtual Addresses*", A. Barrow et al. describe the use of Translation RAM (T/RAM) having a capacity of one entry for each page of supported virtual memory. The use of a monitor bit is also described for each segment of virtual memory. At column 3, lines 3–12 a translation process is described. The translation process may be carried out by a processor executing microcode or by dedicated hardware within the processor. The steps of the translation process are said to include: (a) applying the segment number to locate a page table; (b) applying the virtual page number to address an entry within the page table; (c) obtaining the page table entry; (d) checking the state of a fault bit; and (if the page is in main memory) (e) combining the page frame number with an offset from the virtual address to form a physical address.

One problem that is presented when a data processor employs a micro-coded-approach to virtual address translation is related to the significant number of micro-instructions that must be executed to perform the translation. More particularly, in that each micro-instruction consumes some portion of the data processor's instruction execution bandwidth, it is desirable to make the virtual address translation process as rapid as possible, such as by reducing the total number of micro-instructions that are required to perform the translation. Reducing the number of micro-instructions would not only yield a corresponding improvement in processor performance, but would also reduce the storage requirements of a micro-code control store. Related to the desired improvement in translation time is an ability to rapidly detect the presence of anomalous conditions, such as a faulted zone, segment, or page, that may arise during the translation process, and to provide an efficient mechanism to report and act on the detection of the anomalous translation condition.

OBJECTS OF THIS INVENTION

It is thus a first object of this invention to provide a hardware-assisted virtual address translation technique that overcomes the foregoing and other problems of the prior art.

It is another object of this invention to provide a hardware-assisted virtual address translation technique that provides for a significant reduction in a required number of micro-instructions to achieve the virtual address translation.

It is a further object of this invention to provide a hardware-assisted virtual address translation technique that provides for the rapid detection and reporting of translation anomalies in parallel and simultaneous with the execution of certain steps of the translation process.

SUMMARY OF THE INVENTION

The foregoing and other problems are overcome and the objects of the invention are realized by circuitry and a method of providing hardware-assisted virtual memory address translation. The hardware-assist circuitry is designed to assist the data processor in the determination of a physical memory address for a given virtual address. The design is such that the memory access of an address pointer and the addition of that base pointer to the appropriate table offset are performed simultaneously. The result of that addition is then loaded into a physical memory address register for the access of the next base pointer in a following micro-cycle. In parallel the detection of certain translation anomalies are detected and reported to a control program.

Previously, a virtual address translation sequence required as many as 22 micro-instructions to accomplish. By employing the teaching of this invention the total number of micro-instructions has been reduced to nine. The use of this invention has thus also resulted in the saving of a significant number of valuable micro-code control store locations.

More particularly, this invention provides a method, and circuitry that operates in accordance with the method, for generating an entry for a translation buffer in a data processor that employs virtual memory addressing. The method includes a first step of, in response to the execution of at least one micro-instruction, storing a Faulted Virtual Address in a first register. A Zone Table Address (ZTA) is previously stored in a second register. In response to the execution of a further micro-instruction, a next step forms a first address in memory of a Zone Table Entry (ZTE) by selectively combining the content of the first register with the content of the second register, while simultaneously testing the ZTA for physical address mapping. The first address is placed in a physical address register of a central processor. In response to an execution of a next micro-instruction, a next step forms a second address in memory of a Segment Table Entry (STE) by accessing the ZTE with the first address, selectively combining the content of the first register with a content of the ZTE, while simultaneously testing the ZTE for a Zone fault. The second address is placed in the physical address register of the central processor. In response to an execution of a next micro-instruction, a next step forms a third address in memory of a Page Table Entry (PTE) by accessing the STE with the second address, selectively combining the content of the first register with a content of the STE, while simultaneously testing the STE for a Zone fault. The third address is placed in the physical address register of the central processor. In response to an execution of a next micro-instruction, a next step accesses the PTE with the third address, selectively combines the content of the STE with the content of the PTE, and outputs the combination as the translation buffer entry, while simultaneously testing the PTE for a Page fault.

The data processor has at least one central processor unit (CPU) that includes a translation buffer. The steps of selectively combining are accomplished by circuitry that is external to the CPU, and the steps of accessing are accomplished by the CPU.

The step of selectively combining the content of the STE with the content of the PTE includes the steps of: storing at least a portion of the content of the STE; and logically combining the stored portion with a portion of the content of the PTE. The step of outputting the combination includes a step of outputting a physical page number portion of the PTE with the logical combination.

The step of forming an address in memory of the ZTE by selectively combining the content of the first register with the content of the second register includes a step of adding a physical address of the Zone Table in the second register with a Zone field of the faulted virtual address stored within the first register.

The step of forming an address in memory of the STE by selectively combining the content of the first register with the content of the ZTE includes a step of concatenating a physical address of the Segment Table read from the ZTE with a Segment field of the faulted virtual address stored within the first register.

The step of forming an address in memory of the PTE by selectively combining the content of the first register with the content of the STE includes a step of concatenating a physical address of the Page Table read from the STE with a Page field of the faulted virtual address stored within the first register.

If any of the steps of simultaneously testing indicate a true condition, the method includes a step of terminating the generation of the entry for the translation buffer.

BRIEF DESCRIPTION OF THE DRAWINGS

The above set forth and other features of the invention are made more apparent in the ensuing Detailed Description of the Invention when read in conjunction with the attached Drawings, wherein:

FIGS. 2A–2D are each a portion of a block diagram of a data processor that is constructed and operated in accordance with this invention;

DETAILED DESCRIPTION OF THE INVENTION

Figure 1:
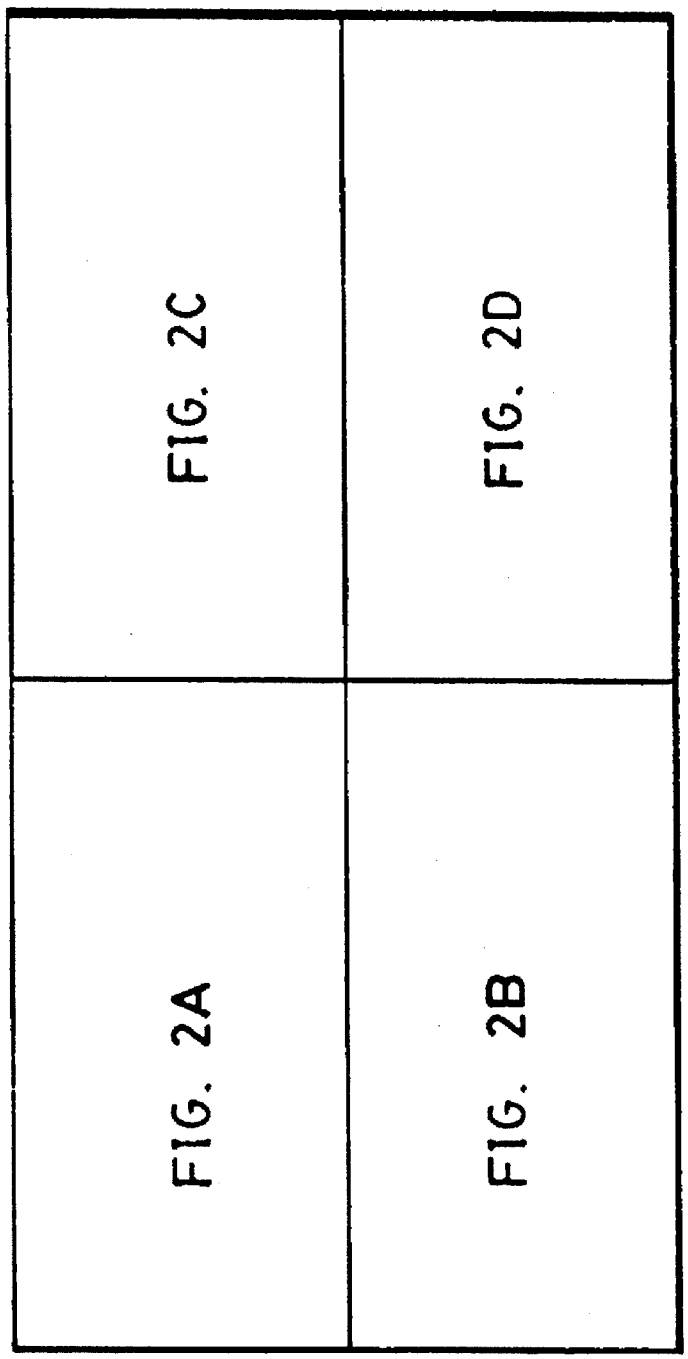
FIG. 1 illustrates the arrangement of FIGS. 2A–2D.
Figure 2A:
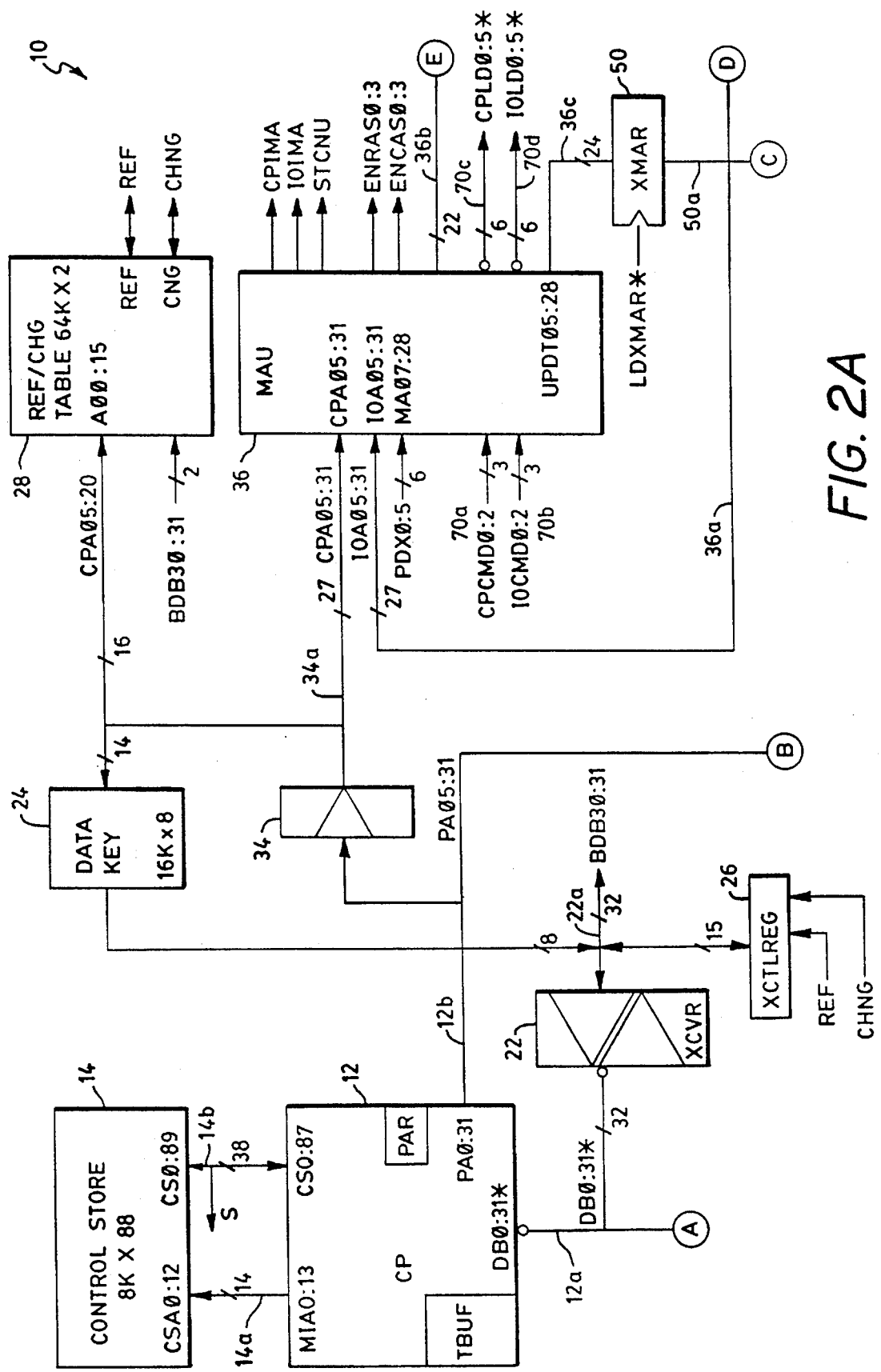
Figure 2B:
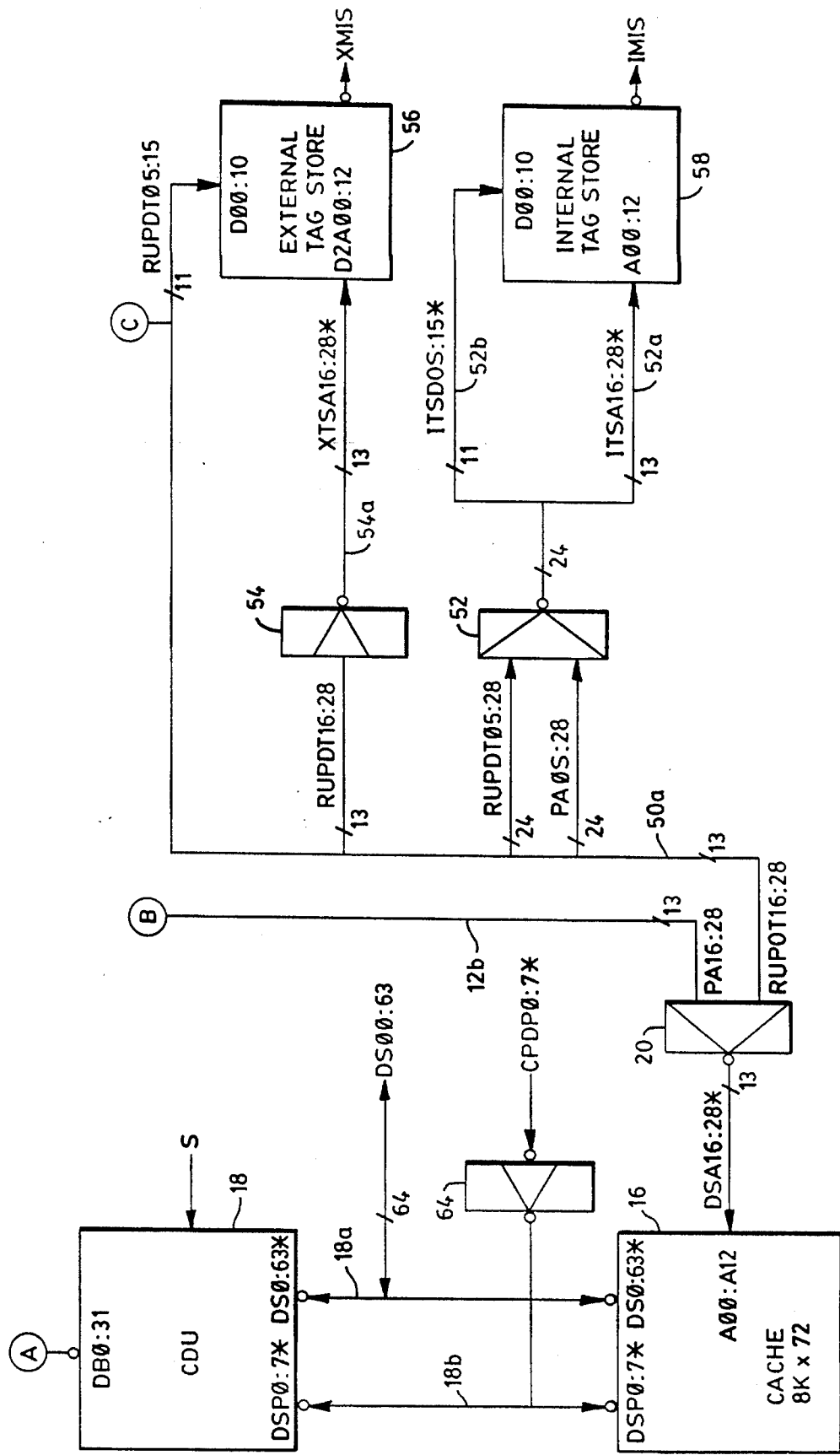
Figure 2C:
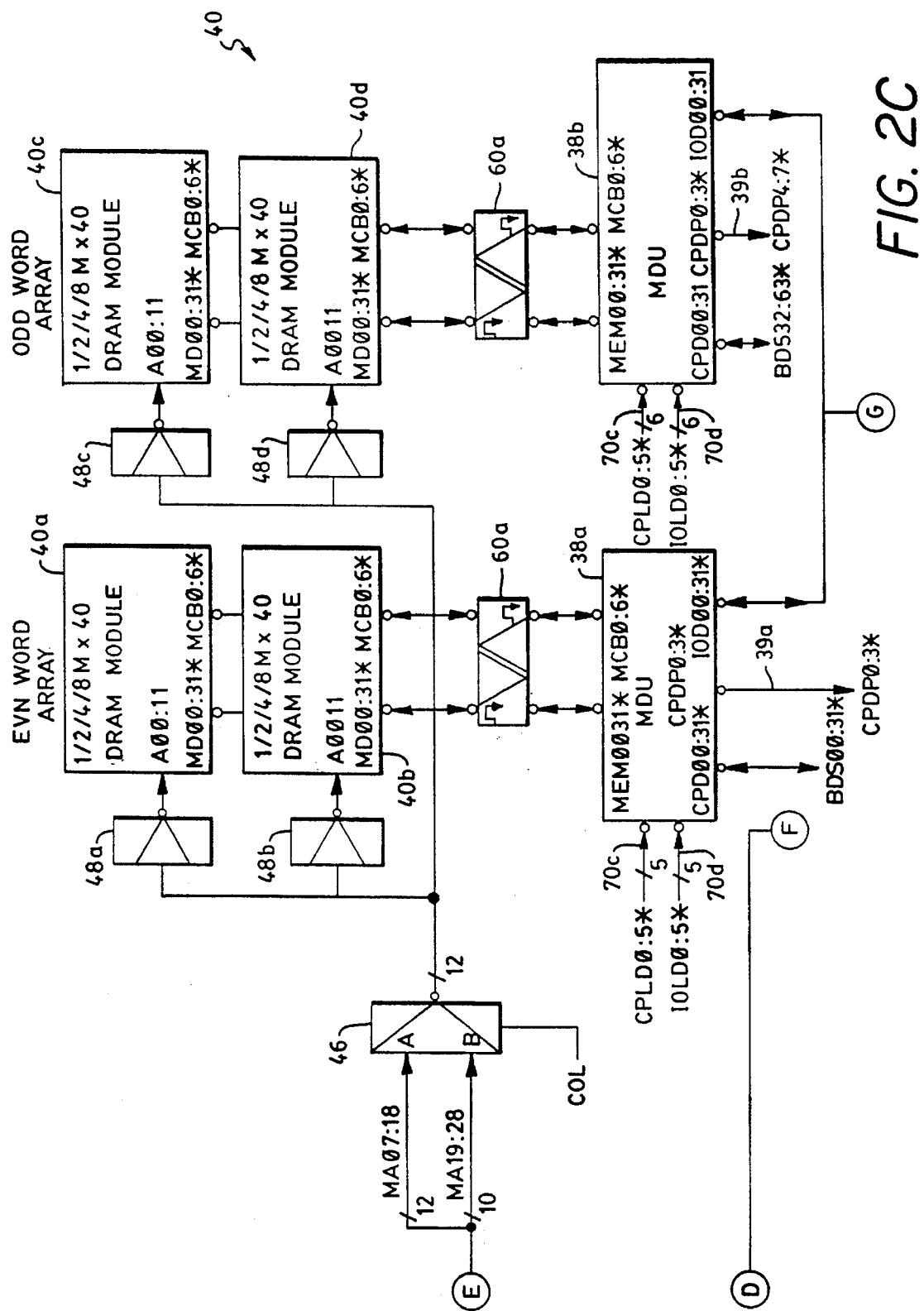

Reference is made to FIGS. 2A–2D for the ensuing description of a data processor 10 that is constructed and operated in accordance with this invention. A Central Processor (CP) 12 is coupled to an 8 K by 88-bit Control Store 14 by a 14-bit control store address bus 14a and an 88-bit control store data bus 14b. The Control Store 14 stores microinstructions which are read into the CP 12 in order to execute macroinstructions that are read from an 8 K by 72-bit CACHE memory 16, via a CACHE Data Unit (CDU) 18, bidirectional 64-bit data bus BDS00:63 18a, and bidirectional 32-bit data bus DB00:32 12a.

Macroinstructions are fetched from the CACHE memory 16 in accordance with physical addresses provided by the CP 12 on a 32-bit physical address bus (PA0:31) 12b, via a CACHE address multiplexer (MUX) 20. The CACHE address MUX 20 is employed when pre-filing the CACHE 16 with instructions and data. In this embodiment of the invention only PA bits 16:28 are provided to the CACHE 20. PA bit 28 being provided as the LSB address bit enables a DoubleWord (eight bytes or two 32-bit words) to be read by the CP 12 over the 64-bit bus 18a and 32-bit bus 12a. The eight bit DSP0:7 bus 18b conveys data parity bits between the CACHE 16 and the CDU 18. The CDU 18 operates as a data buffer for interfacing the 32-bit CP 12 data bus 12a to the 64-bit cache/main memory data bus 18a, as a data error checker, and provides data alignment for the CP 12. The CDU 18 also includes circuitry that cooperates with the CP 12 to provide the hardware-assisted virtual address translation of this invention, as will be described in detail below with respect to FIGS. 3, 4A–4E, and 5.

In the presently preferred embodiment of this invention the macroinstructions that are read from the CACHE 16 are those that implement a VS Assembly Language program that is available from Wang Laboratories Inc. of Lowell MA.

The 32-bit processor data bus 12a is buffered by a transceiver 22 and is provided as a buffered data bus (BDB0:31) 22a to several locations, including a 16 K by 8-bit Data Key memory 24, a 16-bit control and status register (XCTLREG) 26, a reference and change table (REF/CHG TABLE) 28, and a system (backplane) Bus Interface Chip (BIC) 30. This data path gives the CP 12 an ability to send control information to, and read status information from, these various devices.

The Data Key memory 24 stores encrypted information and provides a capability to enable only specified software packages to be executed by the CP 12. The REF/CHG Table 28 functions to indicate a reference to a particular page of memory, and to indicate if the reference was a write operation. The BIC 30 provides an interface to other components that are coupled to the system bus 32, the system bus including a 32-bit multiplexed address/data bus (AD31:0) 32a, associated parity hues (PAR3:0) 32b, and control signal lines 32c. In general, the BIC 30 operates to arbitrate access to the system bus 32 and to perform all necessary handshaking with other devices that are coupled to the system bus 32. A memory control function is also contained within the BIC 30. The XCTLREG 26 enables control over the CACHE memory 16, indicates CACHE status, and also provides indications of correctable and unconnectable data errors.

A buffer 34 drives the PA bus 12b as a CP Address (CPA) bus 34a to the Data Key 24 (14 bits), the REF/CHG Table 28 (16 bits) and a Memory Address Unit (MAU) 36 (27 bits). The MAU 36 operates to queue memory read and write addresses and functions, in conjunction with even and odd Memory Data Units (MDUs) 38a and 38b, respectively, to write and read data from main memory 40. Main memory 40 is comprised of a plurality of DRAM modules 40a–40d, and is organized as an even word array (modules 40a and 40b) and as an odd word array (modules 40c and 40d). The total width of the main memory 40 is 64 bits (a double word), plus 14 bits of ECC parity information. ECC is performed separately on each odd and even 32-bit memory word.

The MAU 36 also receives a 27-bit I/O address (IOA) bus 36a that is sourced from the BIC 30 via a Buffered Address (BA) bus 30a and a latch 42. IOA bus 36a provides a first memory address of a data block that is to be written to or read from by an I/O device that is coupled to the system bus 32. The first address is received though a transceiver 44, a buffered address/data (BAD) bus 44a, and a transceiver 45. Transceiver 45 is enabled to pass the first memory address of the memory block to the BIC 30 and the latch 42, via the BA bus 30a. In the MAU 36 the first address is buffered, and subsequent memory addresses are incremented by the BIC 30 during an I/O operation and provided over the buses 30a and 36a, via latch 42. This enables a potentially large number of reads or writes to be made to consecutive memory locations of the main memory 40.

One output of the MAU 36 is a 22-bit memory address (MA) bus 36b that is applied to a row/column MUX 46 which has a 12-bit output for sequentially providing row and column addresses, via drivers 48a–48d, to the DRAM modules 40a–40d, respectively. The row/column MUX 46 operates under the control of a COL signal that is generated by a memory control state machine (not shown).

Another output of the MAU 36 is a 24-bit update address (UPDT) bus 36c that is latched by a register XMAR50.XMAR50 sources a registered update address (RUPDT) bus 50a to the MUX 20 (13 bits), to a MUX 52 (24 bits), to a driver 54, and to an External Tag Store 56. Also provided to MUX 52 is the PA bus 12b. The output of the MUX 52 is a 13-bit internal tag store address (ITSA) bus 52a and an 11-bit internal tag store data (ITSD) bus 52b which are applied to an Internal Tag Store 58. The output of the driver 54 is a 13-bit external tag store address (XTSA) bus 54a which is applied to the External Tag Store 56, in conjunction with 11-bits of the RUPDT bus 50a. The External Tag Store 56 and the Internal Tag Store 58 provide CACHE hit and miss detection, XMIS and IMIS, respectively, for I/O accesses and CP 12 accesses, respectively.

The MDUs 38a and 38b operate in conjunction with registered buffers 60a and 60b, respectively, to provide a data queue for read and write accesses of the main memory 40. The MDUs 38a and 38b also each provide for word-wide ECC generation and checking functions for data going to and coming from the main memory 40. Each of the MDUs 38a and 38b is bidirectionally coupled to one word (32-bits) of the 64-bit buffered data bus 18a, and thereby to the CACHE 16 and to the CDU 18. Each of the MDUs 38a and 38b also source 4-bits of the 8-bit CP Data Parity (CPDP) bus which is provided through a buffer 64 to the eight bit DSP0:7 bus 18b that conveys data parity bits between the CACHE 16 and the CDU 18. The MDUs 38a and 38b each also have a 32-bit I/O data path (IOD) and are bidirectionally coupled in parallel to a transceiver 62 and thence to the BAD bus 44a. For I/O data transfers to or from the system bus 32 the MDUs are alternately selected to either transmit up to a 32-bit word to the transceiver 62 or receive up to a 32-bit word from the transceiver 62.

The data processor 10 of FIGS. 2A–2D, in a presently preferred embodiment of the invention, is packaged on a single multi-layered printed circuit board. The CDU 18, MAU 36, the MDUs 38a and 38b, and the BIC 30 are each contained within an Application Specific Integrated Circuit (ASIC). A CP 12 cycle is a minimum of 50 nanoseconds in duration (20 MHz clock frequency), and is comprised of two or more 50% duty cycle 25 nanosecond sub-cycles or "ticks". The CP 12 clock is synchronized to a 50 nanosecond clock signal (not 50% duty cycle) that is provided on the system bus 32. A presently preferred technique for deriving the synchronized 50% duty cycle 25 nanosecond (40 MHz) clock ticks from the 20 MHz, non-50% duty cycle system bus clock is described in commonly assigned patent application Ser. No. 08/135,113, filed Oct. 12, 1993, entitled "Clock Frequency Multiplier and Squarer Circuit and Method" by J. MacDonald.

Figure 3:
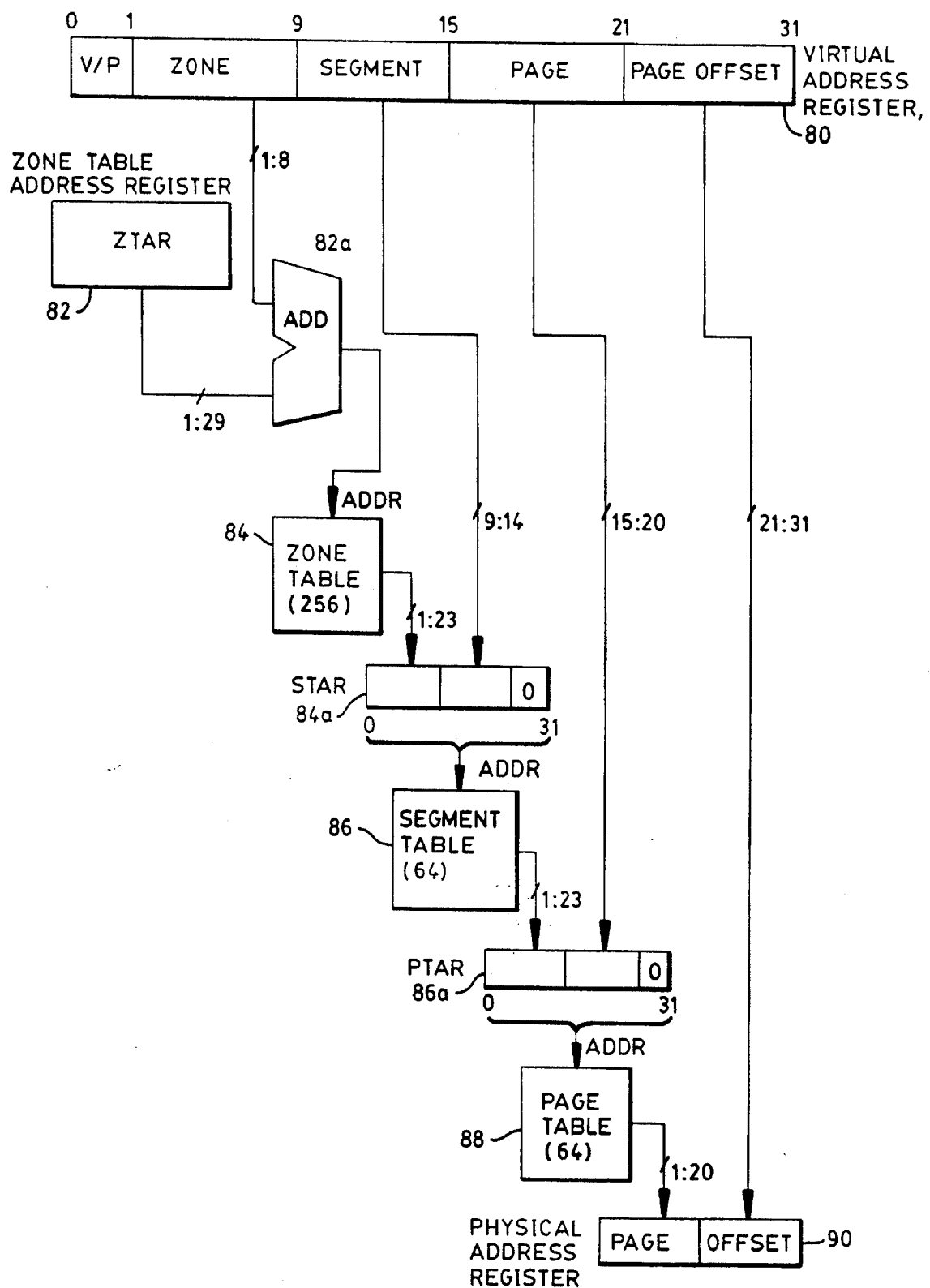
FIG. 3 is a block diagram that illustrates in a conceptual manner the translation of a virtual address to a physical memory address.

Having described the technical environment within which the circuit and method of this invention operates, reference is now made to FIG. 3, which is intended to be viewed in conjunction with FIGS. 4A–4E.

FIG. 3 is a conceptual block diagram of a virtual address translation technique that is executed by the system 10. A virtual address register (VAR) 80 has a length of 32-bits. Bit 0 (MSB) does not form a part of the 31-bit virtual address. Bits 1–31 are partitioned into four fields, specifically, an 8-bit Zone, a 6-bit Segment, a 6-bit Page, and an 11-bit Offset.

Figure 4A:
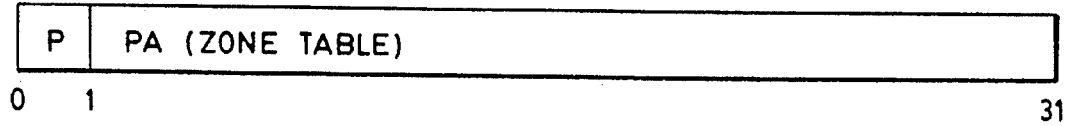
FIG. 4A illustrates the format of a zone table address register.

Translation of virtual addresses begins with a Zone Table Address Register (ZTAR) 82 (FIG. 4A). The ZTAR 82 is loaded by the CP 12 prior to the virtual address translation, for example during a switch from one task to another task. The output of the ZTAR 82 is applied to an adder, in conjunction with the 8-bit VA Zone field, to form a physical address which points to an entry within the Zone Table 84 in main memory 40. The Zone Table 84 contains up to 256 word-aligned entries (FIG. 4B), each of which points, after being concatenated with the 6-bit VA Segment field, to one full-word entry (FIG. 4C) of a 64 entry Segment Table 86. The Segment Table maps 8 Mbytes of virtual address space, and is aligned on a 256-byte boundary. The output of the Zone Table 84 is shown for convenience as being held by a Segment Table Address Register (STAR) 84a, although in the preferred embodiment of this invention no specific register performs this function. In like manner, the output of the Segment Table 86 points, after being concatenated with the 6-bit VA Page field, forms a pointer to one full-word entry (FIG. 4D) of a 64 entry Page Table 88. The output of the Segment Table 86 is shown for convenience as being held by a Page Table Address Register (PTAR) 86a, although in the preferred embodiment of this invention no specific register performs this function. The entry of the Page Table 88 contains a 20-bit Page number which is concatenated with the 11-bit Page Offset field to form a 31-bit Physical Address that is stored within a Physical Address Register (PAR) 90.

Figure 4B:
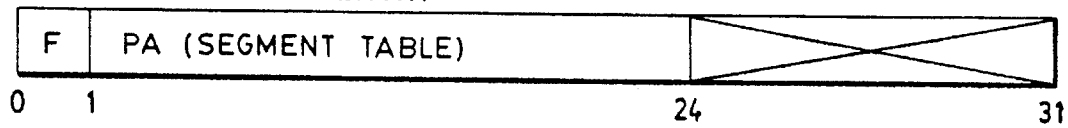
FIG. 4B illustrates the format of a zone table entry.
Figure 4C:
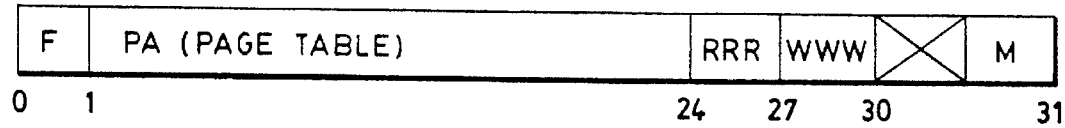
FIG. 4C illustrates the format of a segment table entry.
Figure 4D:
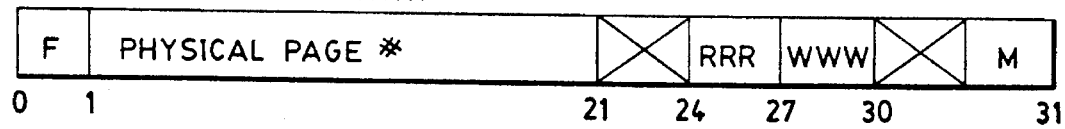
FIG. 4D illustrates the format of a page table entry.

In FIG. 4A, if the MSB (designated P) is a one it is indicated that the address is a physical address, and ZTAR 1:31 are reserved for use by the operating system (OS). In FIG. 4B, ff the MSB (designated F) is a one it is indicated that a Zone Fault exists, and the Zone Table entry bits 1:31 are reserved for use by the OS. The MSBs of the Segment Table Entry (FIG. 4C) and the Page Table Entry (FIG. 4D) have the same meanings, i.e., the presence of a Segment Fault and a Page Fault, respectively. The LSBs of the Segment Table and Page Table entries (designated M), indicate that the associated Segment or Page is monitored, and enables the use of a specific VS Assembly Language instruction that deals with monitored Segments and Pages. The 3-bit fields designed RRR and WWW in the Segment Table entries and the Page Table entries indicate a level (0–7) of read protection and write protection, respectively, for the associated Segment and Page.

In this regard, the disclosure of the above-mentioned commonly-assigned U.S. Pat. No. 4,410,941 (Barrow et al.) is incorporated by reference herein in its' entirety. Although written in the context of 24-bit addressing, this commonly-assigned patent also describes the use of protection and monitor bits with respect to virtual address translation.

Figure 4E:
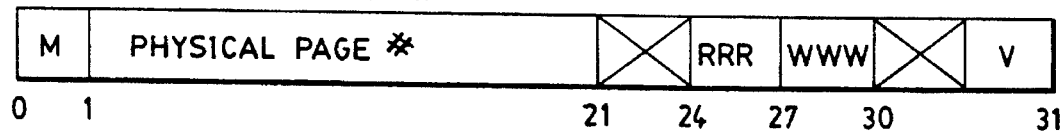
FIG. 4E illustrates the format of a translation buffer (TBUF) load format.

The format for a CP 12 Translation Buffer (TBUF) entry is shown in FIG. 4E. As in the Page Table entry, bits 21 and 30 are not used. The following conditions apply to the setting of the M and the V bits:

M=0, V=1 if monitored;

M=1, V-0 if unmonitored; and

M=1, V=1 to fault the associated TBUF entry.

Figure 5:
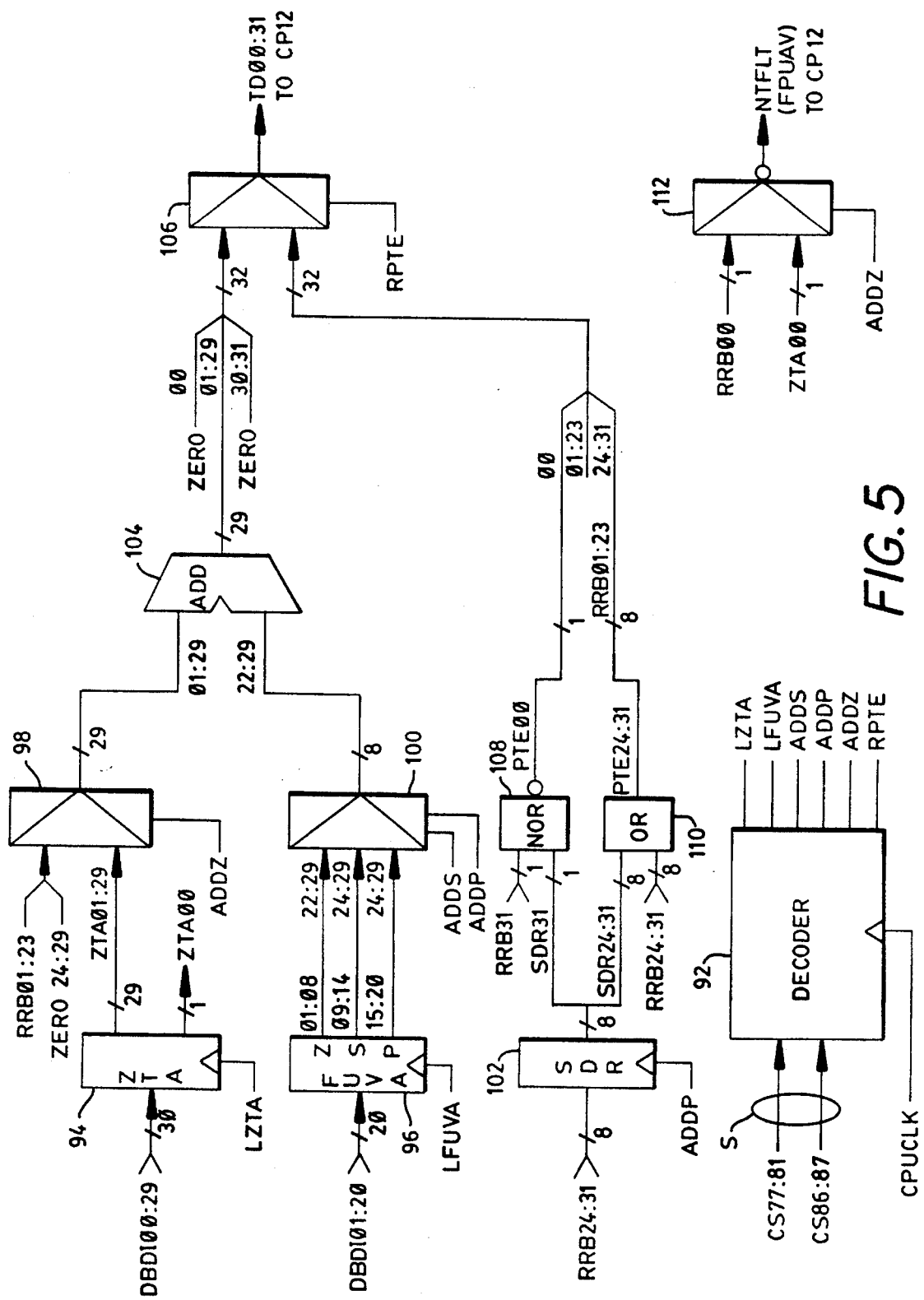
FIG. 5 is a schematic diagram of circuitry that provides a hardware assisted virtual address translation function.

Reference is now made to FIG. 5 which illustrates a schematic diagram of the hardware-assist logic for virtual address translation. The circuitry of FIG. 5 is mostly contained within the CDU 18, and is used when the CP 12 misses on a virtual address translation. The purpose of the hardware-assist circuitry is to provide an entry to the CP 12 TBUF. The TBUF is a cache capable of storing translation information for up to 256 virtual address translations.

A decoder 92 within the CDU 18 is responsive to a plurality of bits (S) that are input from the micro-code control store 14. The decoder 92 is synchronized to the CP 12 clock and provides six control signal outputs for controlling the hardware-assist circuitry within the CDU 18 in response to the execution of a TRNSLATE VS Assembly language instruction. The hardware-assist circuitry is controlled to perform the following four steps:

(1) form the address in main memory of the Zone Table Entry (ZTE) while simultaneously checking for physical address mapping (i.e., bit 0 (P) of ZTAR=1);

(2) form the address in main memory of the Segment Table Entry (STE) while simultaneously checking for a Zone fault (i.e., bit 0 (F) of ZTE=1);

(3) form the address in main memory of the Page Table Entry (PTE) while simultaneously checking for a Segment fault (i.e., bit 0 (F) of STE=1); and (4) read the PTE into a CP 12 Translation Register (TR1) in TBUF format while simultaneously checking for a Page fault (i.e., bit 0 (F) of PTE=1).

A fifth step loads the TBUF entry into the TBUF within the CP 12.

More particularly, the outputs of the decoder 92 are a Load Zone Table Address (LZTA) signal which is applied to a ZTA register 94. The application of the LZTA signal causes the ZTA register 94 to store 30 bits from the internal CDU 18 data bus, the internal CDU 18 data bus being driven with the Zone Table Address from the DB0:31 data bus 12a by the CP 12. A second control signal is a Load Faulted Virtual Address (LFUVA) which is applied to a Faulted Virtual Address Register (FUVA) 96. The application of the LFUVA signal causes the FUVA register 96 to store 20 bits from the internal CDU 18 data bus, the 20 bits corresponding to bits 1:20 of the faulted virtual address (the Zone, Segment, and Page fields as shown in FIG. 3).

The decoder 92 also sequentially outputs an Add Zone (ADDZ) control signal, an Add Segment (ADDS) control signal, and an Add Page (ADDP) control signal. The ADDZ control signal is applied as a control signal to a first multiplexer 98, while the ADDS and ADDP control signals are applied as control inputs to a second multiplexer 100. The ADDP signal is also applied as a clocking input to a Segment Data Register (SDR) 102, which stores bits 24:31 of the Segment Table Entry for subsequent combination with bits 24:31 of the Page Table Entry, as described below.

The outputs of the multiplexers 98 and 100 are applied to an adder 104 which outputs 29 bits to an output multiplexer 106. The output of multiplexer 106 is selectively controlled by a Report Page Table Entry (RPTE) control signal that is output by the decoder 92 after the ADDZ, ADDS and the ADDP control signals. The output of adder 104 is combined with zero bits at bit positions 00, 30, and 31 before application to the output multiplexer 106. The output of the adder 104 (with the zero bits at bit locations 00, 30, and 31) is supplied from the multiplexer 106 to the CP 12 over the DB0:31 data bus 12a. The CP 12 employs this input to form a physical address to first read the Zone Table Entry from main memory, then the Segment Table Entry, and then the Page Table Entry. As each of these Entries are read in turn the content of the Entry appears on a CDU 18 internal 32-bit data bus referred to as a Read Re-order Bus (RRB).

The second 32-bit input to the multiplexer 106 is applied from logic circuitry that includes a NOR function 108 and an OR function 110. The SDR 102, in combination with the NOR function 108, the OR function 110, and the state of bits 24:31 of the Read Re-order Bus that are conveying the output of the PTE, forms the TBUF entry for the CP 12.

More particularly, the outputs of the NOR function 108 and OR function 110 are combined with bits 1:23 of the Read Re-order Bus (RRB01:23) to provide the 32-bit data for the TBUF entry. The TBUF data entry includes, in bit position 0, the NOR of the Segment and Page Table Entry Monitor bits (derived from bit 31 of the SDR 102 and bit 31 of the RRB which is conveying the Page Table Entry). The TBUF data entry also includes, in bit positions 24:31, the OR of the Segment Table Entry and the Page Table Entry RRR, WWW, and V bits (derived from bits 24:31 of the SDR 102 and bits 24:31 of the RRB which is conveying the Page Table Entry).

Two input multiplexer 112 is controlled by the ADDZ control signal to output to the micro-code a status flag that indicates, while ADDZ is asserted, the state of the ZTA bit 0 (P), and while ADDS, ADDP, and RPTE are asserted the state of the RRB bus bit 0 (the Fault indicator for the Zone Table Entry, the Segment Table Entry, and the Page Table Entry, respectively). This status flag is tested by the micro-code and is acted on as follows.

If P=1 in the Zone Table Address Register (ZTAR), then map the TBUF entry as virtual=physical and terminate the virtual address translation operation.

If either the Zone, Segment, or Page is faulted (F=1), then store the faulted virtual address at a predetermined location, and branch to generate a program exception. This effectively terminates the virtual address translation operation.

With respect to the adder 104, the following operations are performed (it is assumed that the LZTA signal has been previously asserted to load the ZTA register 94). After a first micro-code instruction asserts the LFIfVA control signal, and loads the FIfVA register 96, a next micro-code instruction generates the ADDZ control signal. This causes the multiplexer 98 to select bits 01:29 from the ZTA 94, and the multiplexer 100 to select bits 01:08 (Zone field) from the faulted virtual address stored in FUVA 96. The adder 104 thus adds the Zone field to the contents of the ZTAR 82. The output of the adder 104 is combined with zeros at bit positions 00, 30, and 31 and is applied, via multiplexer 106, to the CP 12. The CP 12 receives this data input and stores same in a Physical Address Register (PAR) for subsequent application, during a next micro-code instruction, as a physical address on PA bus 12b to read one entry of the Zone Table 84 within main memory 40 (or cache 16). The selected entry appears on the RRB of the CDU 18 during the next micro-code instruction.

In response to the next micro-code instruction, the physical address is applied to the memory to read the selected entry of the Zone Table 84 and the decoder 92 desserts the ADDZ control signal and asserts the ADDS control signal. This causes the multiplexer 98 to select bits 1:23 of the RRB, along with zeros on bits 24:29, and the multiplexer 100 to select bits 09:14 (Segment field) from the faulted virtual address stored in FUVA 96. The adder 104 then adds the Segment field (appearing on bits 24:29) to the zeros appearing on bits 24:29 of the RRB Zone Table Entry data. This effectively concatenates the Segment field to bits 1:23 of the Zone Table Entry, as depicted in FIG. 3. The output of the adder 104 is again selectively combined with zero bits and applied to the CP 12. As before, the CP 12 stores this data as a physical address in the PAR to access, during a next micro-code instruction, one entry of the Segment Table 86 within the main memory 40.

In response to the next micro-code instruction the physical address is applied from the PAR to the memory to read the selected entry of the Segment Table 86, and the decoder 92 deasserts the ADDS control signal and asserts the ADDP control signal. This causes bits 1:23 from the Segment Table Entry (appearing on RRB01:23) to be concatenated, via adder 104, with bits 15:20 (Page Field) of the faulted virtual address. The output of the adder 104 is selectively combined with zeros and is applied via multiplexer 106 to the CP 12. The CP 12 stores this data as a physical address in the PAR to access, during a next micro-code instruction, one entry of the Page Table 88 within the main memory.

At the time that the ADDP control signal is asserted the portion of the selected Segment Table entry that appears on bits 24:31 of the RRB are latched into the SDR 102. The output of the SDR 102 is subsequently selectively combined during the next micro-code instruction with the data appearing on the RRB from the selected Page Table Entry (with NOR 108 and OR 110) and is concatenated with bits 01:23 of the Page Table Entry appearing on RRB01:23. This provides a 32-bit TBUF Entry that is output to the CP 12 from multiplexer 106 by the assertion of the RPTE control signal during this micro-code instruction.

As it was indicated above, simultaneously with the generation of the physical addresses for the Zone Table, Segment Table, and Page Table the multiplexer 112 is providing status information to reflect the status of the P and F bits of the Zone Table Address Register and the Zone, Segment and Page Table Entries, respectively.

This invention thus provides an efficient and rapid method to update the TBUF entry within the CP 12 in response to the occurrence of a faulted virtual address, while also providing indications of the presence of a physical address within the ZTAR 82 or the presence of a faulted Zone, Segment, or Page Table entry.

As was indicated previously, before the implementation of the circuitry and method of this invention as many as 22 micro-code instructions were required to update the TBUF, whereas the use of the invention requires a total of but nine micro-code instructions. This yields a significant improvement in execution time, and frees a significant number of locations within the control store 14.

While the invention has been particularly shown and described with respect to a preferred embodiment thereof, it will be understood by those skilled in the art that changes in form and details may be made therein without departing from the scope and spirit of the invention.

What is claimed is:

1. A method for generating an entry for a translation buffer in a data processor that employs virtual memory addressing, comprising the steps of:

(a) in response to the execution of at least one micro-instruction of a translate virtual address macroinstruction, storing a Faulted Virtual Address in a first register, the stored Faulted Virtual Address comprising a Zone field portion, a Segment field portion, and a Page field portion;

(b) in response to the execution of a further micro-instruction of the translate virtual address macroinstruction, forming a first memory address of a Zone Table Entry (ZTE) by selectively combining the Zone field portion of the first register with the content of a second register, the second register having stored therein a Zone Table Address (ZTA), while simultaneously testing, during the execution of the further microinstruction, the ZTA for physical address mapping;

(c) in response to an execution of a next micro-instruction of the translate virtual address macroinstruction, accessing the ZTE with the first memory address, forming a second memory address of a Segment Table Entry (STE) by selectively combining the Segment field portion of the first register with a content of the ZTE, while simultaneously testing, during the execution of the next microinstruction, the ZTE for a Zone fault;

(d) in response to an execution of a next micro-instruction of the translate virtual address macroinstruction, accessing the STE with the second memory address, forming a third memory address of a Page Table Entry (PTE) by selectively combining the Page field portion of the first register with a content of the STE, while simultaneously testing, during the execution of this next microinstruction, the STE for a Zone fault; and (e) in response to an execution of a next micro-instruction of the translate virtual address macroinstruction, accessing the PTE with the third memory address, selectively combining a portion of the content of the STE with the content of the PTE, and outputting the combination as a generated translation buffer entry, while simultaneously testing, during the execution of this next microinstruction, the PTE for a Page fault.

2. A method as set forth in claim 1, wherein the data processor has at least one central processor unit (CPU) that includes a translation buffer, wherein the steps of selectively combining are accomplished by circuit means that is external to the CPU, and wherein the steps of accessing are accomplished by the CPU.

3. A method as set forth in claim 1 wherein the step of selectively combining the Page field portion of the first register with a content of the STE includes a step of:

storing at least a portion of the content of the STE;

and wherein the step of selectively combining a portion of the content of the STE with the content of the PTE includes the step of, logically combining the stored portion of the STE with a portion of the content of the PTE; and wherein the step of outputting the combination includes a step of outputting a physical page number portion of the PTE with the logical combination.

4. A method as set forth in claim 1 wherein the step (b) of forming a first memory address of the ZTE by selectively combining the Zone field portion of the first register with the content of the second register includes a step of adding a physical address of the Zone Table in the second register with the Zone field portion of the faulted virtual address stored within the first register.

5. A method as set forth in claim 1 wherein the step (c) of forming a second memory address of the STE by selectively combining the Segment field portion of the first register with the content of the ZTE includes a step of concatenating a physical address of the Segment Table read from the ZTE with the Segment field portion of the faulted virtual address stored within the first register.

6. A method as set forth in claim 1 wherein the step (d) of forming a third memory address of the PTE by selectively combining the Page field portion of the first register with the content of the STE includes a step of concatenating a physical address of the Page Table read from the STE with the Page field portion of the faulted virtual address stored within the first register.

7. A method as set forth in claim 1 wherein, if any of the steps of simultaneously testing indicate a true condition, the method includes a step of terminating the generation of the entry for the translation buffer.

8. Circuitry for assisting in the generation of an entry for a translation buffer in a micro-coded data processor that employs virtual memory addressing, comprising:

first register means for storing a Faulted Virtual Address and second register means for storing a Zone Table Address (ZTA), a stored Faulted Virtual Address comprising a Zone field portion, a Segment field portion, and a Page field portion, said first and second register means each being loadable in response to the execution of preliminary micro-instructions of a translate virtual address macroinstruction;

means, responsive to the execution of a first, subsequent micro-instruction of the translate virtual address macroinstruction, for forming a first memory address of a Zone Table Entry (ZTE) by selectively combining the Zone field portion of the first register with a content of the second register;

means, responsive to an execution of a next, second micro-instruction of the translate virtual address macroinstruction, for accessing the ZTE with the first memory address and for forming a second memory address of a Segment Table Entry (STE) by selectively combining the Segment field portion of the first register with a content of the ZTE;

means, responsive to an execution of a next, third micro-instruction of the translate virtual address macroinstruction, for accessing the STE with the second memory address and for forming a third memory address of a Page Table Entry (PTE) by selectively combining the Page field portion of the first register with a content of the STE;

means, responsive to an execution of a next, fourth micro-instruction of the translate virtual address macroinstruction, for accessing the PTE with the third memory address and for selectively combining a portion of the STE with the content of the PTE and outputting the combination as a generated translation buffer entry; and means, responsive to the execution of the first, subsequent micro-instruction of the translate virtual address macroinstruction, for testing the ZTA for physical address mapping, said testing means being further responsive to the execution of the second micro-instruction of the translate virtual address macroinstruction for testing the ZTE for a Zone fault; to the execution of the third micro-instruction of the translate virtual address macroinstruction for testing the STE for a Segment fault; and to the execution of the fourth micro-instruction of the translate virtual address macroinstruction for testing the PTE for a Page fault.

9. Circuitry as set forth in claim 8, wherein the data processor has at least one central processor unit (CPU) that includes a translation buffer, and wherein said means for selectively combining are located external to the CPU.

10. Circuitry as set forth in claim 9 wherein said CPU is coupled to an output of said combining means by a data bus, and wherein said CPU includes a physical address register that is coupled to the data bus for receiving the first, second, and third memory addresses therefrom.

11. Circuitry as set forth in claim 8 wherein said means for selectively combining a portion of the STE with the content of the PTE includes:

register means for storing at least a portion of the content of the STE; and means for logically combining the stored portion with a portion of the content of the PTE; and wherein said means for outputting the combination outputs a physical page number portion of the PTE with an output of said means for logically combining.

12. Circuitry as set forth in claim 8 wherein said means for forming a first memory address of the ZTE includes means for adding a physical address of the Zone Table in said second register means with the Zone field portion of the faulted virtual address stored within said first register means.

13. Circuitry as set forth in claim 8 wherein said means for forming a second memory address of the STE includes means for concatenating a physical address of the Segment Table read from the ZTE with the Segment field portion of the faulted virtual address stored within said first register means.

14. Circuitry as set forth in claim 8 wherein said means for forming a third memory address of the PTE includes means for concatenating a physical address of the Page Table read from the STE with the Page field portion of the faulted virtual address stored within said first register means.

15. Circuitry as set forth in claim 8 wherein said means for testing includes:

means for selectively outputting at least one bit from said second register means and from the content read from one of the ZTE, STE and PTE; and micro-code means for testing a state of the outputted at least one bit.

\* \* \* \* \*